(12) United States Patent
Nakamura et al.

(10) Patent No.: US 6,853,112 B2
(45) Date of Patent: Feb. 8, 2005

(54) ROTATING ELECTRIC MACHINE

(75) Inventors: Shigenobu Nakamura, Anjo (JP); Takuzou Mukai, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/383,648

(22) Filed: Mar. 10, 2003

(65) Prior Publication Data

US 2004/0032183 A1 Feb. 19, 2004

(30) Foreign Application Priority Data

Mar. 12, 2002 (JP) .......................................... 2002-67520
Sep. 19, 2002 (JP) ....................................... 2002-272696

(51) Int. Cl.[7] .......................... H02K 21/04; H02K 21/14
(52) U.S. Cl. .................................. 310/263; 310/156.72
(58) Field of Search ............................. 310/263, 156.08, 310/156.66, 156.72

(56) References Cited

U.S. PATENT DOCUMENTS

| | | | |
|---|---|---|---|
| 5,483,116 A | | 1/1996 | Kusase et al. |
| 5,973,435 A | * | 10/1999 | Irie et al. ..................... 310/263 |
| 6,013,968 A | * | 1/2000 | Lechner et al. .............. 310/263 |
| 6,150,746 A | * | 11/2000 | Lechner ....................... 310/181 |
| 6,333,582 B1 | * | 12/2001 | Asao et al. ................... 310/263 |
| 6,369,485 B1 | * | 4/2002 | Oohashi et al. .............. 310/263 |
| 6,486,585 B1 | * | 11/2002 | Badey et al. ................ 310/263 |
| 6,548,935 B1 | * | 4/2003 | Shendi et al. ............... 310/263 |
| 2002/0117934 A1 | * | 8/2002 | Kanazawa et al. .......... 310/263 |
| 2002/0117935 A1 | * | 8/2002 | Kanazawa et al. .......... 310/263 |

FOREIGN PATENT DOCUMENTS

| | | | | |
|---|---|---|---|---|
| JP | 361085045 | * | 4/1986 | ................. 310/263 |
| JP | A 10-66286 | | 3/1998 | |
| JP | A 10-313560 | | 11/1998 | |

* cited by examiner

*Primary Examiner*—Tran Nguyen
(74) *Attorney, Agent, or Firm*—Oliff & Berridge, PLC

(57) ABSTRACT

A rotating electric machine for a vehicle includes magnet holders for holding permanent magnets. The magnet holder is fitted between adjacent two claw-like magnetic poles of pole cores, and plural permanent magnets are provided to be magnetized for reducing magnetic-flux leakage between the magnetic poles. The magnet holder includes a radial outer surface, and a protrusion that protrudes from the radial outer surface to a radial outside around a center in a circumferential direction. Therefore, a thickness of the radial outside surface of the magnet holder increases, and its rigidity can be increased. Accordingly, it can prevent the radial outside surface of the magnet holder from being deformed due to centrifugal force, and it can prevent the magnet holder from being damaged.

17 Claims, 9 Drawing Sheets

N POLE   S POLE   N POLE   S POLE   N POLE

ROTATING ELECTRIC MACHINE

CROSS-REFERENCE TO RELATED APPLICATION

This application is related to and claims priority from Japanese Patent Applications No. 2002-67520 filed on Mar. 12, 2002 and No. 2002-272696 filed on Sep. 19, 2002, the contents of which are hereby incorporated by reference.

BACKGROUND OF THE INVENTION

1. Field of the Invention

The present invention generally relates to a rotating electric machine for a vehicle such as an automobile and a truck, more particularly relates to an alternating current (AC) generator for the vehicle.

2. Related Art

In a conventional rotating electric machine for a vehicle, each of permanent magnets is disposed between the circumferential side surfaces of adjacent two Lundell-type claw-like magnetic poles provided in a rotor, to diminish the magnetic flux leakage between the adjacent two claw-like magnetic poles. When the rotor rotates, centrifugal force is applied to the permanent magnets outside in a radial direction of the rotor. Therefore, it is necessary to prevent the permanent magnets from projecting to the radial outside of the rotor. Accordingly, the permanent magnets are fixed to the rotor by a magnet holder provided at the outer periphery of the permanent magnets. Specifically, the magnet holder is constructed with plural square cylindrical segments each of which is formed by pressing a non-magnetic material plate in a square cylindrical shape so as to cover each of the permanent magnets. Alternatively, as disclosed in U.S. Pat. No. 5,483,116, the magnet holder is made of a non-magnetic material, and is constructed with zigzag segments each having a U-shape. In this case, the permanent magnets are held by the segments having the U-shape.

However, the magnet holder is supported by the adjacent two claw-like magnetic poles only at radial outside ends thereof. Accordingly, when the rotor rotates, the centrifugal force is applied to the permanent magnets radially outside. Therefore, the magnet holder is deformed by the centrifugal force, and is readily broken. When the magnet holder is broken, the magnets may be separated from the rotor.

SUMMARY OF THE INVENTION

In view of the above problem, it is an object of the present invention to provide a rotating electric machine which has a magnet holder with a high rigidity.

According to the present invention, in a rotating electric machine, pole cores include a plurality of claw-like magnetic poles formed on an outer periphery thereof, and the claw-like magnetic poles are disposed to engage with each other and to rotate integrally with a shaft. Further, each of permanent magnets is disposed between circumferentially adjacent two claw-like magnetic poles, and each of the permanent magnets is magnetized in a direction where magnetic flux leakage is reduced between the circumferentially adjacent two claw-like magnetic poles. In addition, a magnet holder for holding each of the permanent magnets is fitted between side surfaces of the circumferentially adjacent two claw-like magnetic poles. The magnet holder including a radial outer surface, and a protrusion that protrudes from the radial outside surface to a radial outside at an approximate center portion in a circumferential direction of the pole cores.

Accordingly, the radial thickness of the radial outside surface of the magnet holder increases, and rigidity of the radial outside surface at the circumferentially center can be increased. When the rotating electric machine rotates at a high rotational speed, centrifugal force is applied to the permanent magnets to outside in the radial direction. However, according to the present invention, it is restrict the radial outside surface of the magnet holder from being deformed because the protrusion is provided. Thus, the magnet holder is difficult to be broken, and the permanent magnets can be restricted from being separated.

The magnet holder can be formed by bending a non-magnetic plate to have a space to which the permanent magnet is fitted. In this case, two ends of the non-magnetic plate are joined to each other to form the protrusion by any one of welding and pressing. Alternatively, the protrusion can be directly formed by pressing without joining the two ends.

Preferably, the magnet holder includes two axial stoppers at axial ends, and at least one of the axial stoppers extends from one circumferential side surface of the magnet holder to the other circumferential side surface thereof at one axial end. In this case, one end of the axial stopper is connected to the one axial end of the one circumferential side surface, and the other end of the axial stopper is positioned on an imaginary extension surface of the other circumferential side surface. Further, the axial stopper extends in the circumferential direction of the pole cores while being curved in a wave shape in an axial direction of the pole cores. Therefore, it can effectively restrict a movement of the permanent magnets in the axial direction.

On the other hand, in a rotating electric machine of the present invention, a rotor includes a cylindrical portion on which field coils are provided, and a pair of Lundell-type pole cores each having a disk portion radially expending from an axial end of the cylindrical portion and a plurality of claw-like magnetic poles connected to the disk portion. In the rotor, the claw-like magnetic poles are provided to surround the cylindrical portion, each of the claw-like magnetic pole has a flange extending in a circumferential direction at its radial outside portion, and a root portion of a circumferential side surface of each claw-like magnetic pole is connected to an inside surface of the disk portion at a side of the field coils. In this case, a permanent magnet having a substantially rectangular parallelopiped shape extending in a longitudinal direction is provided, and a magnet holder is formed by a non-magnetic metal plate, for surrounding longitudinal surfaces of the permanent magnet. In this rotating electric machine, the magnet holder is disposed to be enclosed by circumferential side surfaces of adjacent two claw-like magnetic poles, the flange thereof and the inside surface of the disk portion. Further, the magnet holder has a radial outer surface extending in the longitudinal direction and a protrusion that protrudes to a radial outside from the radial outer surface, and the protrusion extends in the longitudinal direction between circumferentially adjacent two flanges of the claw-like magnetic poles. Accordingly, the magnet holder can be readily formed with a simple structure, while it can prevent the permanent magnet from being separated from the rotor.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
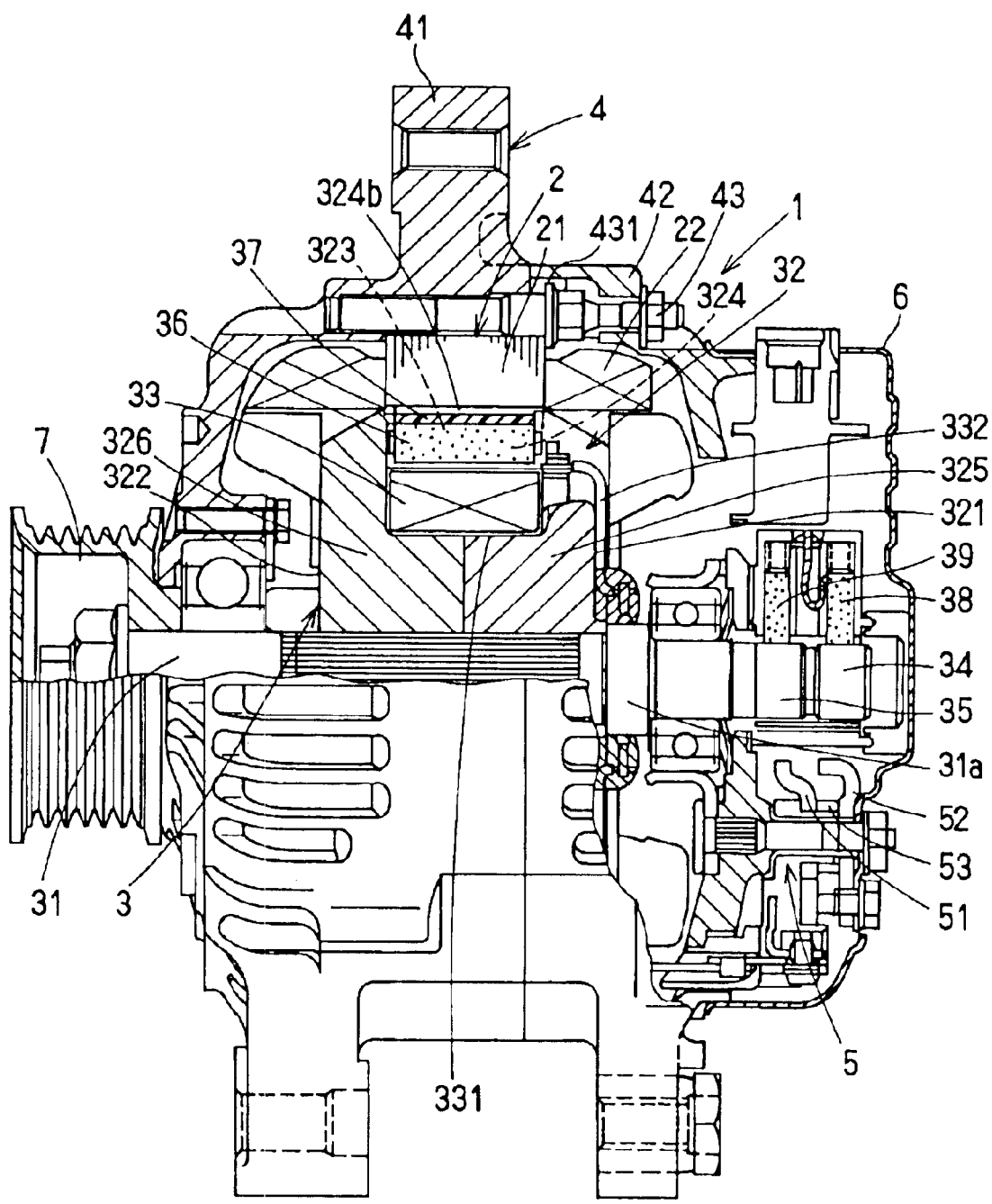
FIG. 1 is a cross-sectional view showing a vehicle alternating current (AC) generator according to a first embodiment of the present invention.

In the first embodiment, a rotating electric machine of the present invention is typically used for a vehicle alternating current (AC) generator 1. As shown in FIG. 1, the vehicle alternating current (AC) generator 1 according to the first embodiment includes a stator 2, a rotor 3, a housing 4, a rectifying unit 5, a cover 6, a pulley 7 and the like. The stator 2 includes a stator core 21 and stator coils 22, and is supported by the housing 4. The stator core 21 is formed by stacking plural thin steel plates, and has plural slots (not shown) in its inner side surface. The stator coils 22 are inserted into the plural slots, and an AC voltage is generated in the stator coils 22 by rotation of a rotor 3.

Figure 2:
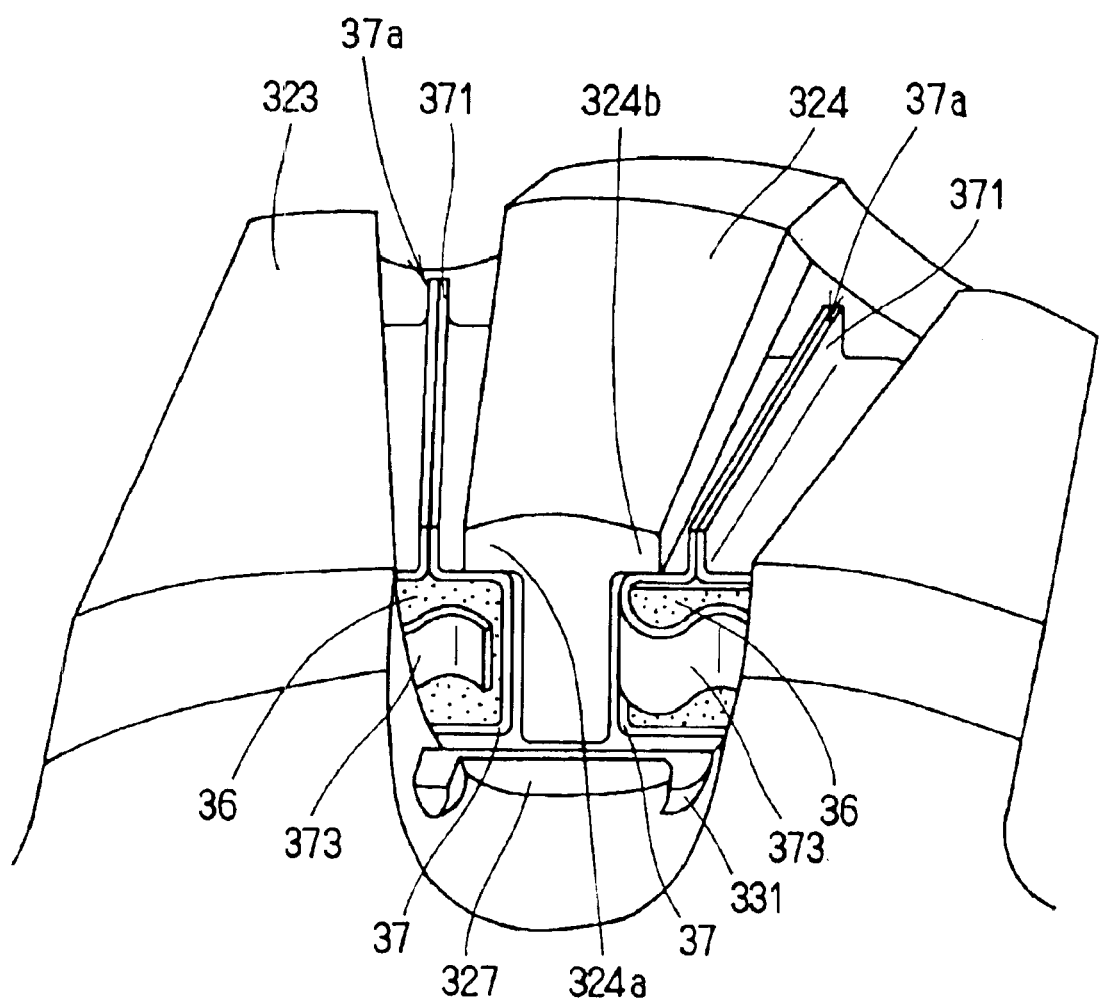
FIG. 2 is a perspective view showing a part of a rotor of the vehicle AC generator according to the first embodiment.

The rotor 3, shown in FIGS. 1, 2, rotates integrally with a shaft 31. The rotor 3 includes pole cores 32, field coils 33, two slip rings 34, 35, sixteen permanent magnets 36, magnet holders 37 and the like. One end of the shaft 31 is connected to the pulley 7, so that the shaft 31 is rotated by a vehicle engine (not shown) for driving a vehicle. A ring stopper portion 31a, for fixing the pole cores 32 to an outer periphery of the shaft 31, is integrated to the shaft 31. The pole cores 32 includes circular plate portions 321, 322 attached to the shaft 31, eight claw-like magnetic poles 323, and eight claw-like magnetic poles 324. The eight claw-like magnetic poles 323 and the eight claw-like magnetic poles 324 extend so as to engage with each other. Further, wound portions 325, 326, on which the plural field coils 33 are provided, are formed at a center of the pole cores 32 through a resin bobbin 331. Here, when electrical current flows in the field coils 33, all the claw-like magnetic poles 323 are magnetized to the south pole (S pole), and all the claw-like magnetic poles 324 are magnetized to the north pole (N pole).

Figure 3A:
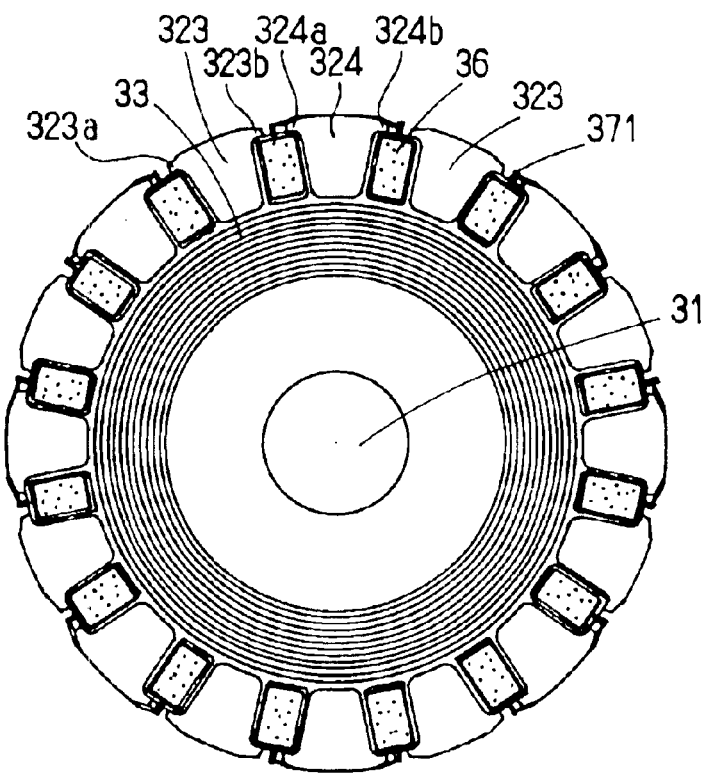
FIG. 3A is an axial sectional view showing the rotor of the vehicle AC generator according to the first embodiment.
Figure 3B:
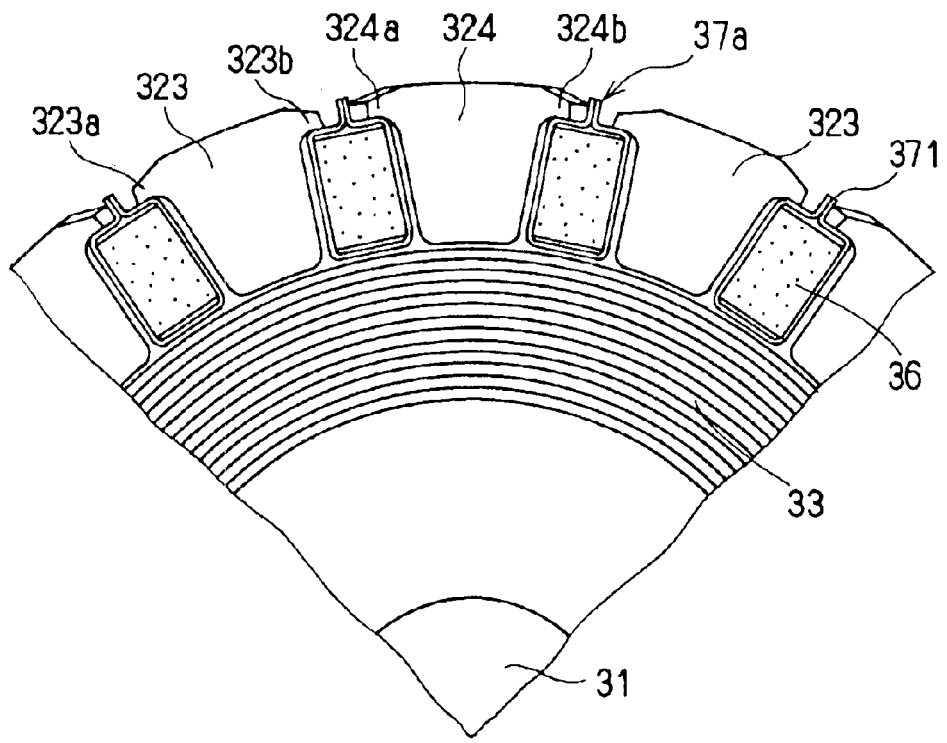
FIG. 3B is an enlarged view showing a part of the rotor shown in FIG. 3A.
Figure 4A:
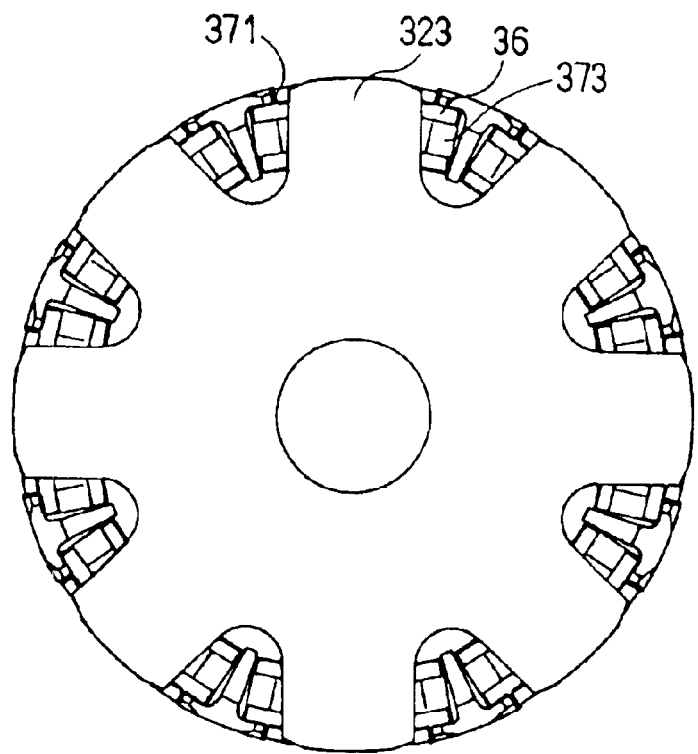
FIG. 4A is an axial side view showing the rotor of the vehicle AC generator according to the first embodiment.
Figure 4B:
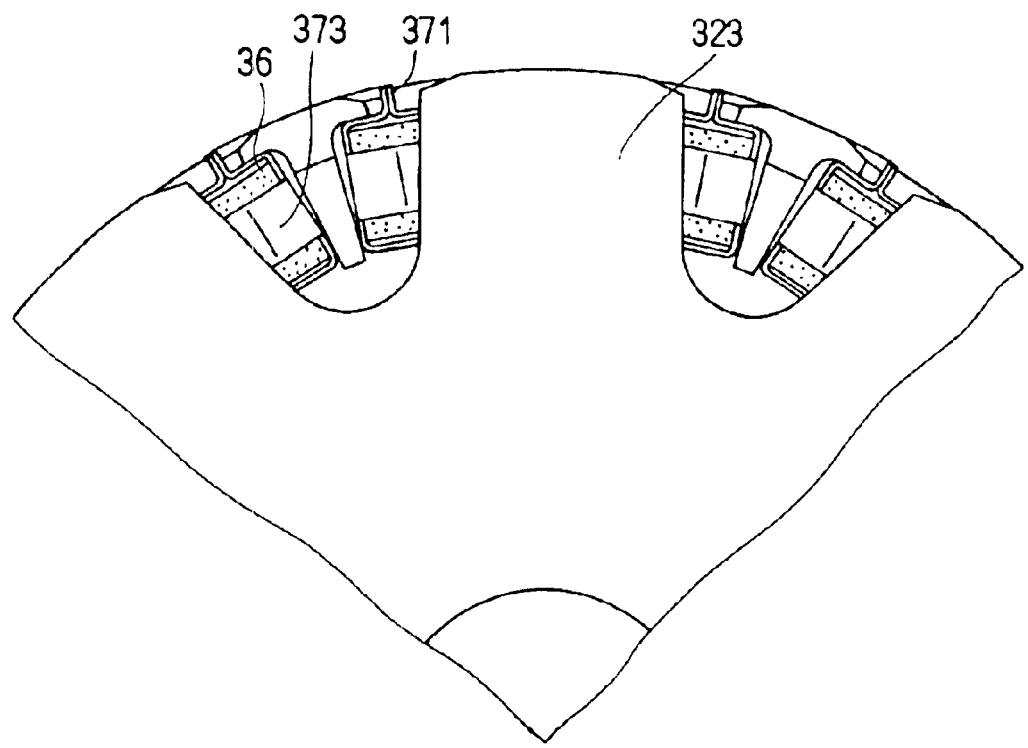
FIG. 4B is an enlarged view showing a part of the rotor shown in FIG. 4A.
Figure 5A:
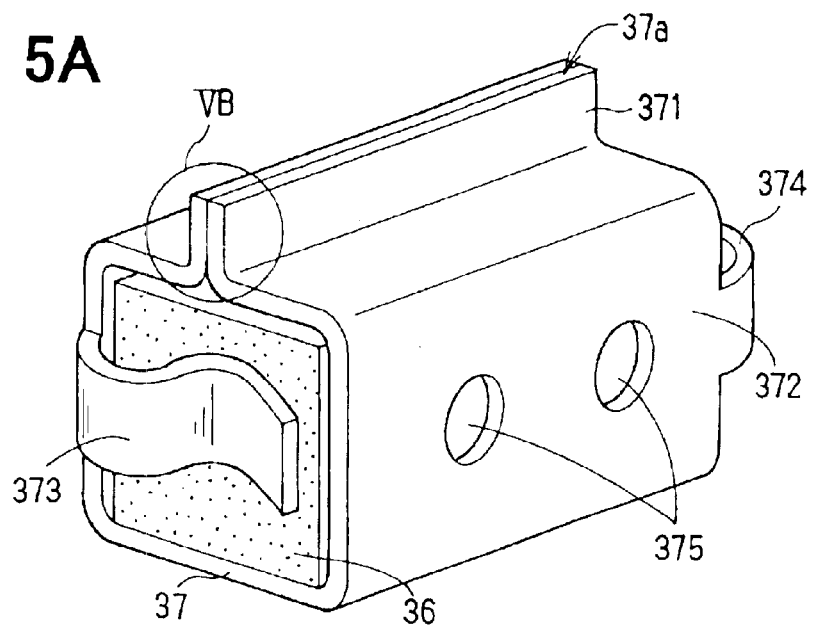
FIG. 5A is a perspective view showing the magnet holder of the vehicle AC generator according to the first embodiment.

As shown in FIGS. 2, 3A and 3B, the claw-like magnetic poles 323, 324 are provided with flange potions 323a, 323b, 324a, 324b protruding from their radial outside end surfaces in a circumferential direction of the pole cores 32. Therefore, a magnet holder 37, which surrounds the permanent magnet 36 as shown in FIG. 5A, can be prevented from projecting outside the rotor 3 in the radial direction. The flange portions 323a, 323b, 324a, 324b engage with circumferential ends of the radial outer end surfaces of sixteen magnet holders 37, respectively, to hold the magnet holders 37.

Winding-start ends and winding-finish ends of the field coils 33 are connected to the slip rings 34, 35 through lead wires 332. In FIGS. 1, 2, the field coils 33 in the first embodiment are impregnated with an epoxy resin injected from a recess portion 327 provided between an outer peripheral portion of the circular plate portion 321 and a root portion of the claw-like magnetic poles 323. This impregnation is performed to prevent the field coils 33 from shifting and to prevent abnormal sounds from being generated due to this shifting. The two slip rings 34, 35 are attached to one end of the shaft 31. Brushes 38, 39 slide on circumferential surfaces of the two slip rings 34, 35, so that a magnetization current is supplied to the field coils 33.

The permanent magnet 36 is generally formed in a rectangular parallelopiped shape from a ferrite magnet, a rear earth magnet, a resin magnet molded by a nylon powder, a neodymium (Nd) powder, an iron (Fe) powder and a boron (B) powder, or the like. Each of the sixteen permanent magnets 36 is disposed between the circumferential side surfaces of the adjacent two claw-like magnetic poles 323, 324, and is magnetized to diminish the magnetic flux leakage between the adjacent two claw-like magnetic poles 323, 324. Further, two circumferential side surfaces of each permanent magnet 36 contact the circumferential side surfaces of the adjacent two claw-like magnetic poles 323, 324 in the circumferential direction. At least the outer peripheral surface of the permanent magnet 36 is held by the magnet holder 37.

Figure 5B:
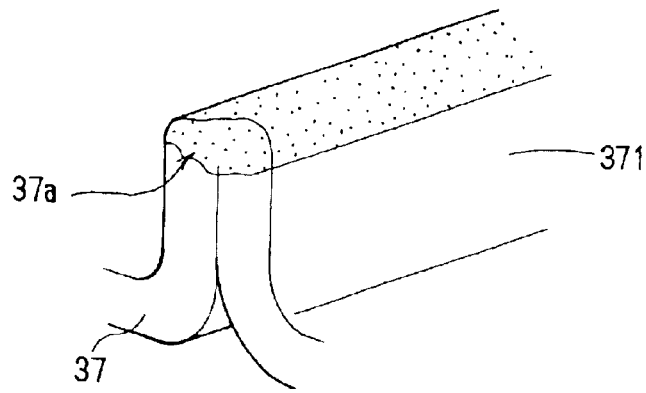
FIG. 5B is an enlarged view of the part VB shown in FIG. 5A.

The magnet holder 37 is formed from a non-magnetic plate member such as an aluminum plate, a stainless steel plate and the like, and surrounds the outer peripheral surfaces of the permanent magnet 36 extending in a longitudinal direction as shown in FIG. 5A. The magnet holder 37 includes a protrusion 37a on one of its longitudinal-extending surfaces at an approximate center in the circumferential direction. The protrusion 37a protrudes generally vertically from the longitudinal-extending surface of the magnet holder 37, and extends on the longitudinal-extending surface entirely along its longitudinal direction. In the first embodiment, a plate member for forming the magnet holder 37 is bent at two ends, and the two ends of the plate member are joined to each other, thereby forming a join portion 371. In the first embodiment, the protrusion 37a is formed by the join portion 371 of the two ends. Therefore, a thickness of the longitudinal-extending surface, at a position where the protrusion 37a is provided, is increased than the other thickness of the magnet holder 37. Furthermore, a protruding end of the join portion 371 (protrusion portion 37a) is bonded by welding as shown in FIG. 5B.

The magnet holder 37 includes axial stoppers 373, 374. Each of the axial stoppers 373, 374 extends in vertical relative to a side surface 372, from one longitudinal end of the side surface 372. Here, two opposite side surfaces 372 (circumferential side surface) are generally perpendicular to the surface (radial outer surface) on which the protrusion 37a is provided in the magnet holder 37. Each of the axial stoppers 373, 374 is formed in a S-shape to be curved in a wave shape in the longitudinal direction of the magnet holder 37. Each top end of the axial stoppers 373, 374 is positioned on an imaginary extension surface of the side surface 372. The side surface 372 has at least one magnetic-pole identification hole 375, for identifying the magnetic pole (north pole, or south pole) of the permanent magnet 36. The magnetic pole of the permanent magnet 36 after magnetization is identified by marking the permanent magnet 36 at any one of the north pole and the south pole.

Further, the housing 4 includes a cup-shape front frame 41 and a cup-shape rear frame 42, and the frames 41, 42 are fixed to each other using a bolt 43. Further, components such as the stator 2 and the rotor 3 are supported by and fixed to the frames 41, 42. One axial end of the stator 2 contacts an inside of the front frame 41, and the other axial end thereof contacts a flange 431 of the bolt 43. Thus, the stator 2 is fixed to the housing 4 while being sandwiched between the front frame 41 and the flange 431.

The rectifying unit 5 is disposed outside the rear frame 42, and includes a negative-electrode rectifying element (not shown), a positive-electrode rectifying element (not shown), a negative-electrode radiation fin 51, a positive-electrode radiation fin 52, a terminal base 53 and the like. The negative-electrode rectifying element is disposed on the negative-electrode radiation fin 51, and the positive-electrode rectifying element is disposed on the positive-electrode radiation fin 52. A connection terminal (not shown), for connecting the rectifying elements and the stator coils 21, is disposed on the terminal base 53.

The cover 6 is formed by pressing an aluminum plate, and is attached to an outside of the rear frame 42 so as to cover electric components such as the rectifying unit 5. The cover 6 has plural suction holes through which cooling air is sucked thereinto. The pulley 7 is connected to a front end of the rotor 3, and motive power from a vehicle engine (not shown) is transmitted by the pulley 7 to the rotor 3 through a belt. The rotor 3 is rotated in a predetermined direction by rotating the pulley 7.

Next, an assembling method of the rotor 3 will be described with reference to the drawings. At first, as shown in FIG. 5A, a non-magnetic plate is bent so that the magnet holder 37 has a space in which the permanent magnet 36 can be fit. As shown in FIG. 5B, the radial outside end of the join portion 371 is connected by welding. The axial stopper 373 at one longitudinal end of the magnet holder 37 is bent outside the magnet holder 37 so that the permanent magnet 36 can be inserted into the magnet holder 37. After the permanent magnet 36 is inserted into the magnet holder 37, the bent axial stopper 373 is returned to an original position.

Then, the pole core 32 having the claw-like magnetic poles 323 is disposed so as to cover the field coils 33, and each of the magnet holders 37 each surrounding the permanent magnet 36 is fit between an outer circumferential surface of the field coils 33 and the circumferential side surface of the claw-like magnetic pole 323. The pole core 32 having the claw-like magnetic poles 324 is disposed so that each of the claw-like magnetic poles 324 is disposed between side surfaces of adjacent two claw-like magnetic poles 323. Thus, as shown in FIGS. 3A, 3B, the radial outside surfaces of the magnet holders 37 are supported by the flanges 323a, 323b, 324a, 324b of the claw-like magnetic poles 323, 324. Then, the shaft 31 is press-fitted to an axial center of the pole cores 32, and thereafter the slip rings 34, 35 are attached to an outer periphery of the shaft 31, thereby forming the rotor 3.

Next, operation of the vehicle AC generator 1 according to the first embodiment will be described with reference to FIG. 2. When the shaft 31 is rotated by the vehicle engine through the pulley 7, the rotor 3 is rotated integrally with the shaft 31. Therefore, the sixteen magnet holders 37, each of which is disposed between the circumferential side surfaces of the adjacent two claw-like magnetic poles 323, 324, are also rotated by the rotation of the rotor 3. Thus, the centrifugal force is applied to the sixteen permanent magnets 36, each of which is closed by the magnet holders 37, toward outside in the radial direction of the rotor 3. Further, when the excitation current flows in the field coils 33, the magnetic flux is generated in the pole cores 32. At this time, the claw-like magnetic poles 323 are magnetized to the south pole, and the claw-like magnetic poles 324 are magnetized to the north pole. In this case, the magnetic flux leakage is reduced by the permanent magnets 36 between the side surfaces of the adjacent two claw-like magnetic poles 323, 324. Further, because a magnetic flux from the permanent magnets 36 is applied to the stator core 21, an AC current is generated in the stator coils 22.

Next, operational effects according to the first embodiment will be described. As described above, the plate member for forming the magnet holder 37 is bent so that the two ends of the plate member are joined to form the join portion 371 that protrudes from the radial outside surface of the magnet holder 37 at an approximate center in the curcumferential direction. Therefore, the thickness of the radial outside surface of the magnet holder 37 increases in the radial direction, and the rigidity of the radial outside surface of the magnet holder 37 can be increased. When the rotor 3 rotates at a high rotational speed, the centrifugal force is applied to the permanent magnets 36 outside in the radial direction. However, in the first embodiment, the outside surface of the magnet holder 37 can be restricted from being deformed due to the centrifugal force. Accordingly, the magnet holder 37 is difficult to be broken, and it can prevent the permanent magnet 36 from projecting from the magnet holder 37. Furthermore, because the join portion 371 is strongly connected by welding, the rigidity of the radial outside surface of the magnet holder 37 can be further increased.

Further, the axial stoppers 373, 374 are formed in the S-shape to extend from one circumferential end of the side surface 372 in the circumferential direction, and is curved in the wave shape in the longitudinal direction (i.e., axial direction). Furthermore, the free top ends of the axial stoppers 373, 374 are positioned on the imaginary extension surface of the side surface 372. Therefore, when the magnet holder 37 is fitted between the side surfaces of the adjacent two claw-like magnetic poles 323, 324, the free top end of each of the axial stoppers 373, 374 contacts one of the side surfaces, and is pushed in the circumferential direction.

Furthermore, the other end of each of the axial stoppers 373, 374 contacts the other side surface, and is pushed by the other side surface in the circumferential direction. Thus, axial force is applied to curved portions of the axial stoppers 373, 374, contacting the axial end surfaces of the permanent magnet 36, so that the curved portions of the axial stoppers 373, 374 pinch the permanent magnet 36 in the axial direction. Therefore, the permanent magnet 36 can be restricted from moving in its axial direction.

Further, the magnetic flux leakage is diminished by the permanent magnets 36 between side surfaces of the adjacent two claw-like magnetic poles 323, 324. Further, the side surface 372 of the magnet holder 37 has at least one magnetic-pole identification hole 375 to identify the magnetic pole (north pole, or south pole) of the permanent magnet 36. Therefore, the permanent magnet 36 after magnetization can be prevented from being erroneously attached to the magnet holder 37. Further, the radial outside surface of the magnet holder 37 is supported by the flanges 323a, 323b, 324a, 324b of the claw-like magnetic poles 323, 324. Therefore, the magnet holder 37 can be restricted from moving outside in the radial direction. In the first embodiment, the protrusion 37a of the magnet holder 37 can be formed around the center of the radial outer surface of the magnet holder 37 in the circumferential direction.

(Second Embodiment)

Figure 6:
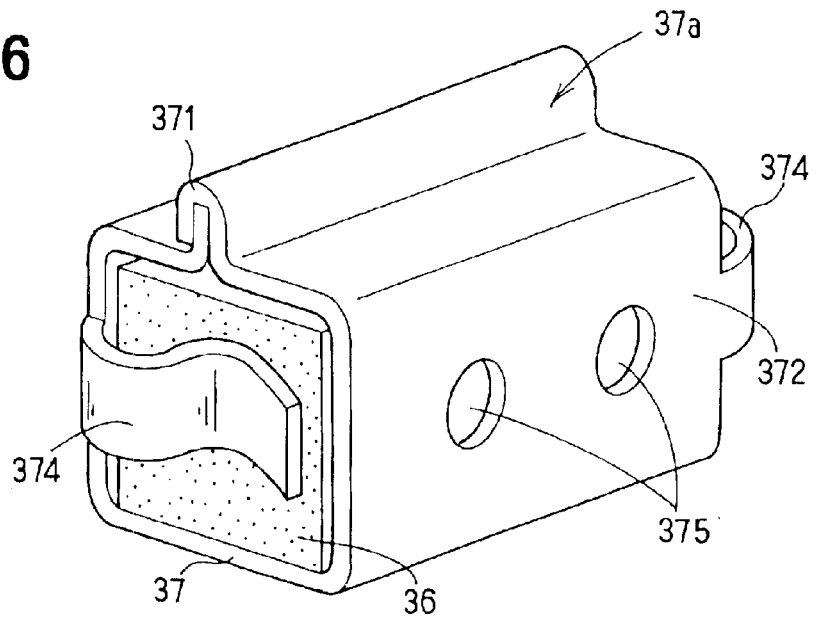
FIG. 6 is a perspective view showing a magnet holder including a join portion, in a vehicle AC generator according to a second embodiment of the present invention.

As shown in FIG. 6, in the second embodiment, the join portion 371 of the magnet holder 37 is fastened by pressing in place of the welding in the first embodiment. In the second embodiment, description of the same parts as in the first embodiment will be omitted, and only different parts will be described. At first, a single non-magnetic plate is bent so that the magnet holder 37 has a space in which the permanent magnet 36 can be fitted. Further, the two ends of the non-magnetic plate are joined, and are fastened by pressing, so that the join portion 371 is formed. Similarly to the above-described first embodiment, the join portion 371 protrudes from the radial outer surface of the magnet holder 37 to form the protrusion 37a. Specifically, one end portion of the non-magnetic plate in the join portion 371 is bent to form an insertion portion, and the other end portion thereof is inserted into the insertion portion. Thereafter, the join portion 371 is tightly fastened by pressing or the like.

Therefore, as in the first embodiment, since the thickness of the radial outside surface of the magnet holder 37 increases, the rigidity of the radial outside surface at its center can be increased. When the rotor 3 rotates at a high rotational speed, the centrifugal force is applied to the permanent magnets 36 outside in the radial direction. However, in the second embodiment, the outside surface of the magnet holder 37 can be restricted from being deformed due to the centrifugal force. Accordingly, the magnet holder 37 is difficult to be broken, and the permanent magnet 36 can be restricted from projecting.

(Third Embodiment)

Figure 7A:
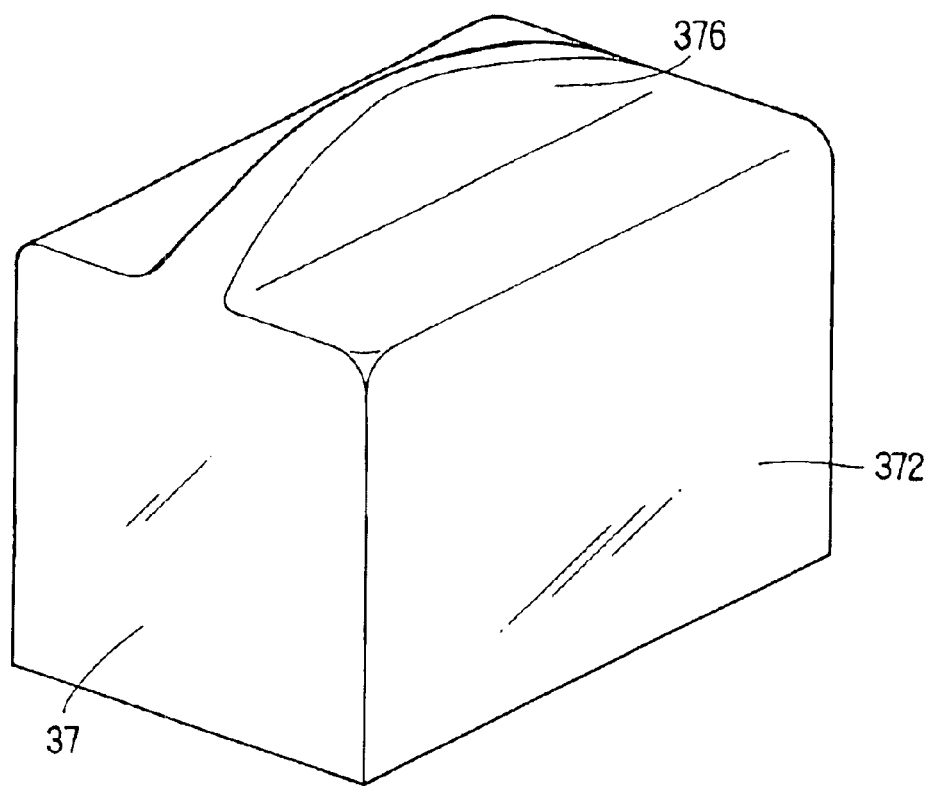
FIG. 7A is a perspective view showing a magnet holder of a vehicle AC generator according to a third embodiment of the present invention.
Figure 7B:
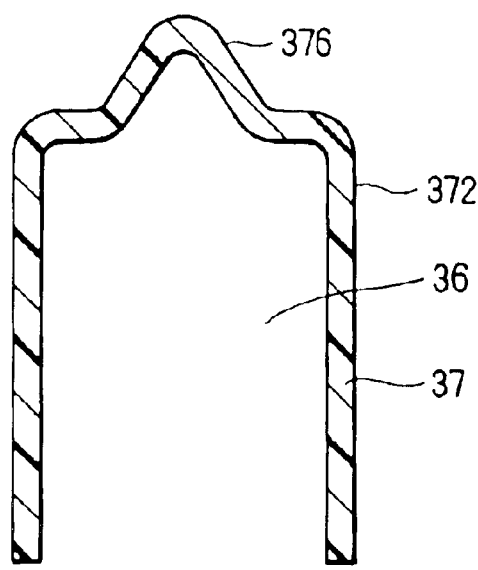
FIG. 7B is a vertical sectional view showing the magnet holder shown in FIG. 7A.

As shown in FIGS. 7A, 7B, in the third embodiment, the magnet holder 37 is different from that in the first embodiment. In the third embodiment, description of the same parts as in the first embodiment will be omitted, and only different parts will be described. As shown in FIG. 7B, the magnet holder 37 is formed so that its cross-section in a direction perpendicular to its longitudinal direction has an approximately U-shape. As shown in FIGS. 7A, 7B, one of longitudinal-extending surfaces protrudes at a circumferential center by pressing in its vertical direction, thereby forming a protrusion portion 376. That is, the radial outer side surface of the magnet holder 37 protrudes radial outside at a center portion in the circumferential direction.

Therefore, as in the first embodiment, the radial thickness of the radial outside surface of the magnet holder 37 increases, the rigidity of the radial outside surface at the circumferential center can be increased. When the rotor 3 rotates at a high rotational speed, the centrifugal force is applied to the permanent magnets 36 outside in the radial direction. However, also in the third embodiment, the radial outside surface of the magnet holder 37 can be restricted from being deformed due to the centrifugal force. Accordingly, the magnet holder 37 is difficult to be broken, and the permanent magnet 36 can be restricted from projecting.

Further, because the protrusion portion 376 is formed integrally with the radial outer surface of the magnet holder 37 in a continuously extending plate surface without a joining, the rigidity of the radial outer surface of the magnet holder 37 can be simply formed.

Further, as in the first embodiment, the side surface 372 of the magnet holder 37 can have at least one magnetic-pole identification hole 375 to identify the magnetic pole (north pole, or south pole) of the permanent magnet 36. Therefore, the permanent magnet 36 after magnetization can be prevented from being erroneously attached into the magnet holder 37. In the first to third embodiments, the flanges 323a, 323b, 324a, 324b are formed at the radial outside ends of the claw-like magnetic poles 323, 324. However, each of the claw-like magnetic poles 323, 324 may be made thinner toward its axially top end to be formed in a taper shape in place of the flanges 323a, 323b, 324a, 324b. Even in this case, the circumferential side surfaces of the magnet holder 37 are supported by the tapered surfaces of the claw-like magnetic poles 323, 324. Therefore, the magnet holder 37 can be restricted from moving outside in the radial direction. In the third embodiment, the protrusion portion 376 is formed on the radial outside surface of the magnet holder 37 at its circumferential center. However, the protrusion portion can be formed on the radial outside surface of the magnet holder 37 around the circumferential center without being limited to the circumferential center.

(Fourth Embodiment)

Figure 8:
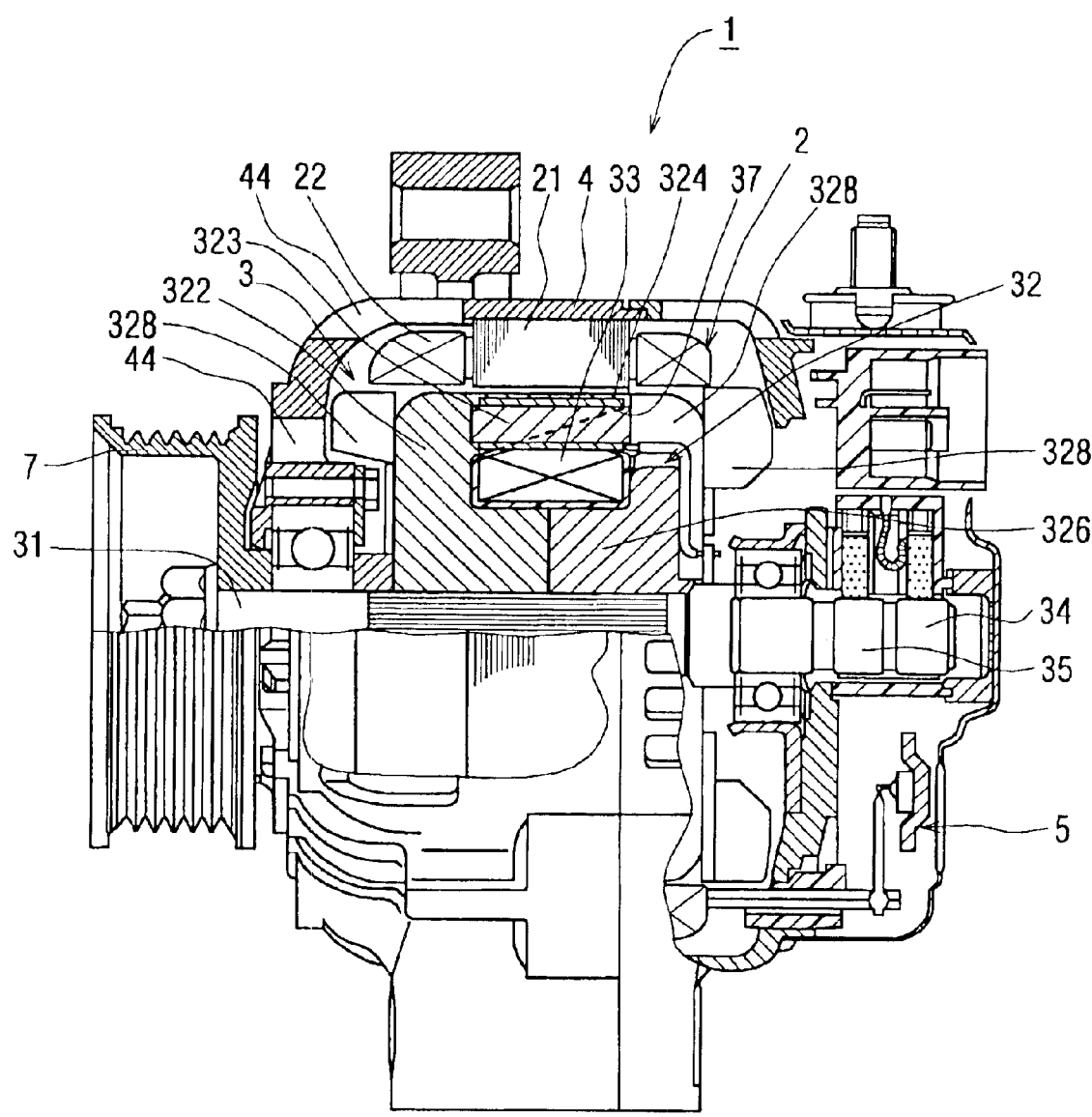
FIG. 8 is a cross-sectional view showing a vehicle AC generator according to a fourth embodiment of the present invention.
Figure 9:
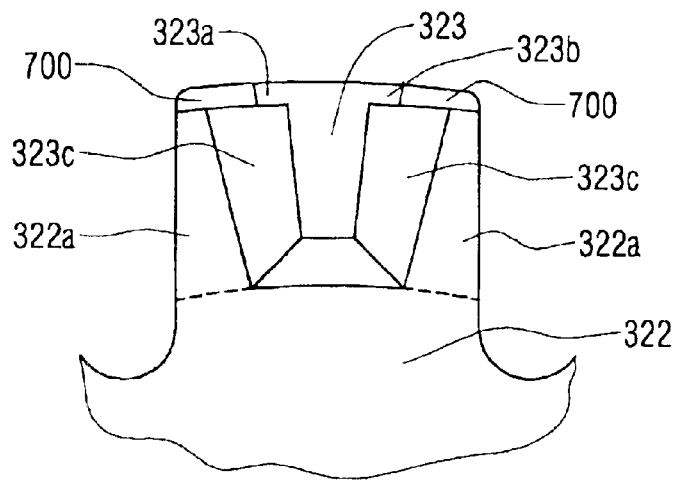
FIG. 9 is a plan view showing a part of pole cores of a rotor in the vehicle AC generator according to the fourth embodiment.

The fourth embodiment will be now described with reference to FIGS. 8–13. In the fourth embodiment, the present invention is typically applied to a vehicle AC generator shown in FIG. 8. In the fourth embodiment, description of the same parts as in the first to third embodiments will be omitted, and only different parts will be described. As shown in FIG. 9, a root portion of a circumferential side surface 323c of the claw-like magnetic pole 323 is connected to an inside surface 322a of the circular plate portion 322 at the side of the filed coils 33. In this embodiment, the magnet holder 37 has a longitudinal dimension that is set shorter than a slant length of the inside surface 322a. Therefore, the permanent magnets 36 can be effectively supported in the axial direction.

Figure 10:
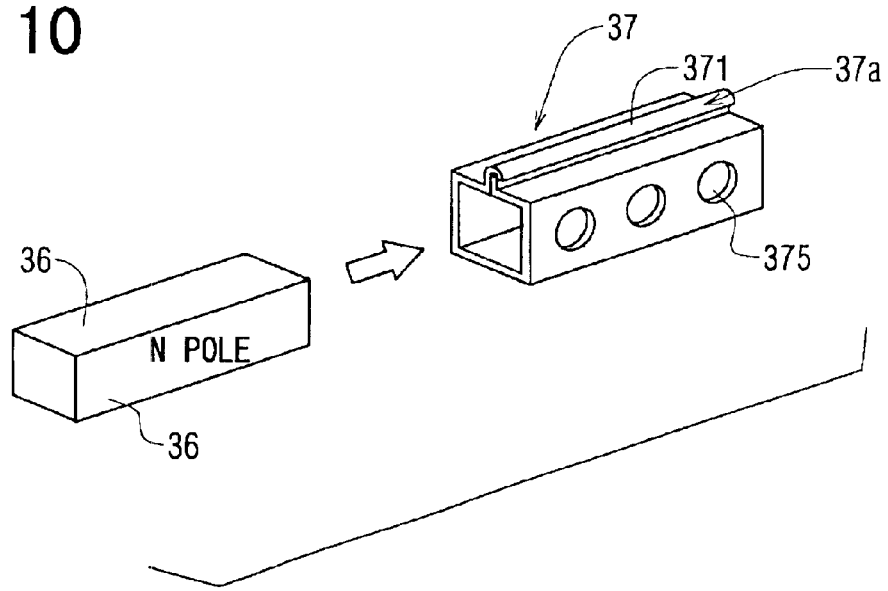
FIG. 10 is a perspective view showing a permanent magnet and a magnet holder in the vehicle AC generator according to the fourth embodiment.
Figure 11:
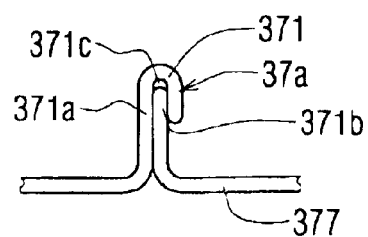
FIG. 11 is an enlarged view showing a join portion of the magnet holder, in the vehicle AC generator according to the fourth embodiment.
Figure 12:
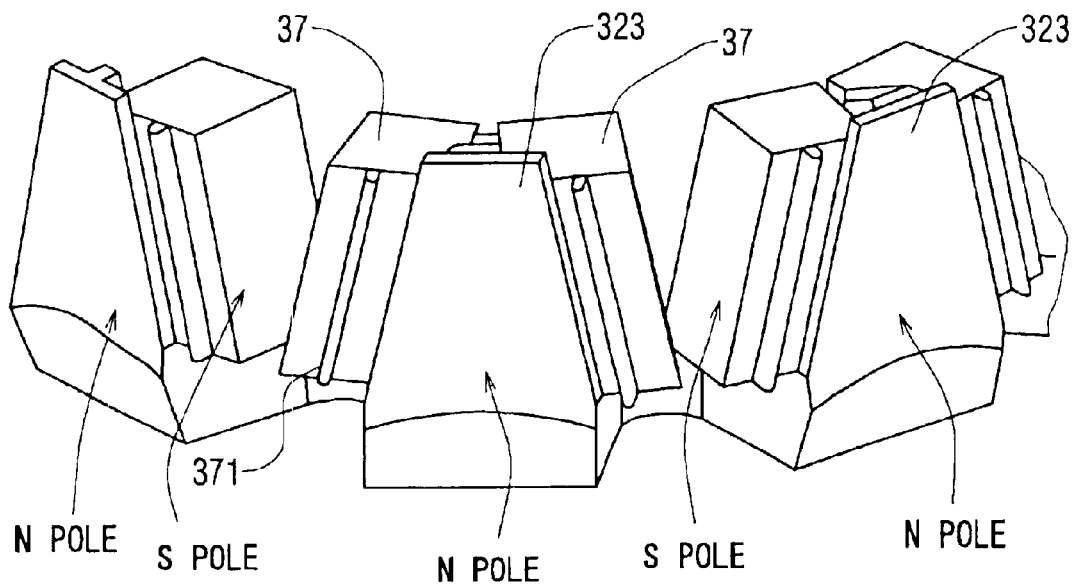
FIG. 12 is a schematic diagram showing an attachment state of the magnet holders to the rotor in the vehicle AC generator according to the fourth embodiment.

As shown in FIG. 10, the permanent magnet 36 is magnetized to the north pole and the south pole on two longitudinal-extending planes facing each other, respectively. The magnet holder 37 is formed in a rectangular cylindrical shape so as to cover the longitudinal-extending planes of the permanent magnet 36. As shown in FIG. 11, the magnet holder 37 includes a protrusion 37a on a surface 377 perpendicular to its surfaces facing the north pole plane and the south pole plane of the permanent magnet 36. The protrusion 37a is formed by end portions 371a, 371b extending in the axial direction of the magnet holder 37, and protrudes to a side opposite to the permanent magnet 36. The end portion 371a is bent in a U-shape to define a ditch 371c therein, and the end portion 371b is inserted into the ditch 371c so that the join portion 371 used as the protrusion 37a is formed. The magnet holder 37 is inserted between the side surfaces 323c of the adjacent two claw-like magnetic poles 323, 324 in the circumferential direction, to be held by the inside surface 322a of the circular plate portion 322 in the axial direction, and by the flanges 323a, 323b in the centrifugal direction. At this time, as shown in FIG. 12, the magnet holders 37 are disposed so that the north pole of each permanent magnet 36 faces each side surface 323c of the claw-like magnetic poles 323 magnetized to the north pole by the field coils 33. That is, the magnet holders 37 are disposed so as to prevent the magnetic flux leakage between the adjacent claw-like magnetic poles 323, 324 which are magnetized to the north pole and the south pole, respectively.

The protrusion 37a of the magnet holder 37 protrudes outside in the radial direction of the rotor 3, and a top end of the protrusion 37a is located inside from the radial outside end of the pole cores 32. While the pair of pole cores 32 is attached to the shaft 31 together with the field coils 33, the magnet holders 37 are attached to the pair of the pole cores 32. Thereafter, in the rotor 3, the pole cores 32, the field coils 33 and the magnet holders 37 are impregnated with a thermal resistant resin to be fixed to each other. Further, since a circumferential side surface of the magnet holder 37 has the magnetic-pole identification holes 375, the thermal resistant resin enters the holes 375, thereby increasing fixing force between the magnet holder 37 and the permanent magnet 36. As shown in FIG. 8, cooling fans 328 are provided at both of axial ends of the pole cores 32, respectively. Since the cooling fans 328 are rotated by the rotation of the pole cores 32, cooling air passes through air holes 44, and cools the inside of the housing 4.

Accordingly, in the fourth embodiment of the present invention, the magnet holder 37 can be accurately fixed at a predetermined position, and the effective magnetic flux can be increased by the permanent magnets 36 while the magnet holders 37 can be prevented from being separated, thereby realizing stable and high output of the vehicle AC generator. Further, the protrusion 37a of the magnet holders 37 can operate as cooling fins for radiating heat generated by eddy currents caused in outer periphery portions of the claw-like magnetic poles 323, 324 including the flanges 323a, 323b, 324a, 324b. Furthermore, since the magnet holder 37 can be formed by bending a simple rectangular plate, production cost can be reduced.

Although the present invention has been fully described in connection with the preferred embodiments thereof with reference to the accompanying drawings, it is to be noted that various changes and modifications will become apparent to those skilled in the art.

Figure 13:
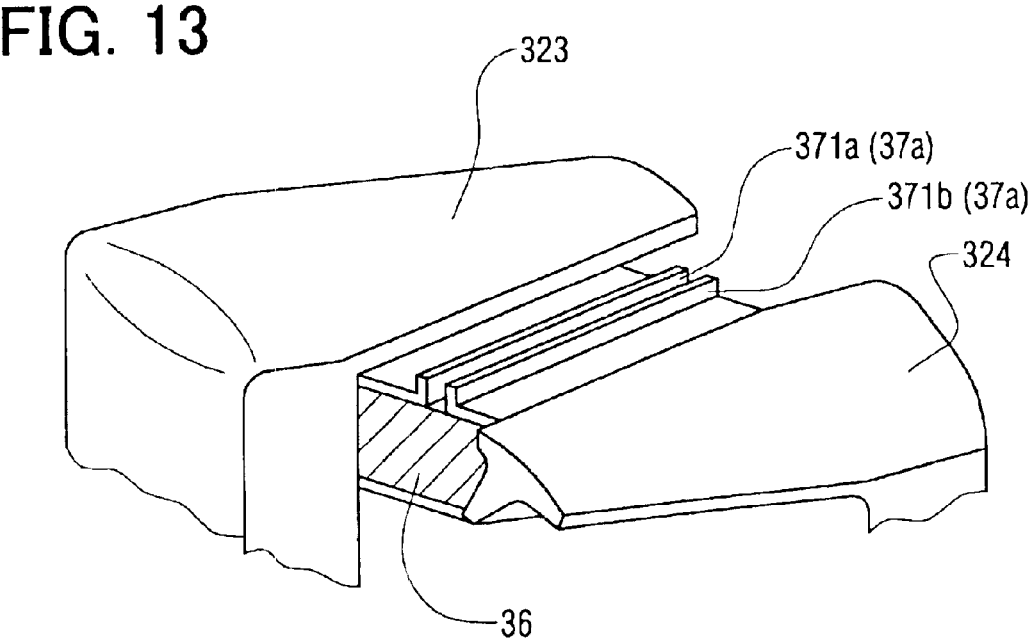
FIG. 13 is an enlarged schematic diagram showing a part of an attachment state of the magnet holder to the rotor, according to a modification the fourth embodiment.

For example, in FIGS. 10 and 11 of the fourth embodiment, the end portion 371 is bent to be joined to the end portion 371a in the protrusion 37a of the magnet holder 37. However, as shown in FIG. 13, the end portions 371a, 371b of the magnet holder 37 are not required to be joined to each other, and a clearance can be provided between the end portions 371a, 371b. In this case, the magnet holder 37 can increase a radiation area, and heat can be radiated to cooling air, blown by the cooling fans 328, flowing between the claw-like magnetic poles 323, 324. Therefore, the heat generated by the eddy currents can be more effectively radiated outside. In FIGS. 10A and 10B, the protrusion 37a extends in the longitudinal direction of the magnet holder 37. However, the protrusion is not required to extend accurately in the longitudinal direction, but may extend approximately in the longitudinal direction.

Such changes and modifications are to be understood as being within the scope of the present invention as defined by the appended claims.

What is claimed is:

1. A rotating electric machine for a vehicle, comprising:
   a shaft;
   pole cores including a plurality of claw-like magnetic poles formed on an outer periphery thereof, the claw-like magnetic poles being disposed to engage with each other and to rotate integrally with the shaft;
   a plurality of permanent magnets each of which is disposed between circumferentially adjacent two claw-like magnetic poles and each of which is magnetized in a direction where magnetic flux leakage is reduced between the circumferentially adjacent two claw-like magnetic poles; and
   a magnet holder for holding each of the permanent magnets, the magnet holder being fitted between side surfaces of the circumferentially adjacent two claw-like magnetic poles, the magnet holder including a radial outer surface, and a protrusion that radially protrudes from the radial outside surface to approximately a center portion between circumferentially adjacent two claw-like magnetic poles, wherein:
   each of the claw-like magnetic poles has a flange portion extending in a circumferential direction at a radial outside portion;
   the radial outer surface of the magnet holder is disposed to contact a radial inner surface of the flange portion of an adjacent claw-like magnetic pole;
   the magnet holder is formed by bending a non-magnetic plate to have a space to which the permanent magnet is fitted; and two ends of the non-magnetic plate are joined to each other to form the protrusion.

2. The rotating electric machine according to claim 1, wherein the two ends of the non-magnetic plate are joined by any one of welding and pressing.

3. The rotating electric machine according to claim 1, wherein the protrusion is formed by pressing.

4. The rotating electric machine according to claim 1, wherein:
   the magnet holder includes two axial stoppers at axial ends;
   at least one of the axial stoppers extends from one circumferential side surface of the magnet holder to the other circumferential side surface thereof at one axial end;
   one end of the axial stopper is connected to the one axial end of the one circumferential side surface, and the other end of the axial stopper is positioned on an imaginary extension surface of the other circumferential side surface; and
   the axial stopper extends in the circumferential direction of the pole cores while being curved in a wave shape in an axial direction of the pole cores.

5. The rotating electric machine according to claim 1, wherein a side surface of the magnet holder has at least one magnetic-pole identification hole for identifying a magnetic pole of the permanent magnet disposed in the magnet holder.

6. The rotating electric machine according to claim 1, wherein a radial outside end of each claw-like magnetic pole protrudes in the circumferential direction of the pole cores.

7. The rotating electric machine according to claim 1, wherein the magnet holder is disposed to have at least the radial outer surface, and two side surfaces extending approximately vertically from the radial outer surface to a radial inside.

8. The rotating electric machine according to claim 1, wherein the magnet holder is disposed to surround radial inner and outer surfaces and circumferential side surfaces of the permanent magnet.

9. The rotating electric machine according to claim 1, wherein the protrusion extends on the radial outer surface of the magnet holder in an axial direction of the pole cores.

10. A rotating electric machine for a vehicle, comprising:
field coils;
a rotor including:
a cylindrical portion on which the field coils are provided; and
a pair of Lundell-type pole cores each having a disk portion radially expending from an axial end of the cylindrical portion, and a plurality of claw-like magnetic poles connected to the disk portion, wherein the claw-like magnetic poles are provided to surround the cylindrical portion, each of the claw-like magnetic pole has a flange extending in a circumferential direction at its radial outside portion, and a root portion of a circumferential side surface of each claw-like magnetic pole is connected to an inside surface of the disk portion at a side of the field coils;
a stator including stacked pole cores and armature coils, the stator being disposed radial outside of the claw-like magnetic poles to be opposite to the claw-like magnetic poles;
a permanent magnet having a substantially rectangular parallelopiped shape extending in a longitudinal direction; and
a magnet holder formed by a non-magnetic metal plate, for surrounding longitudinal surfaces of the permanent magnet, wherein:
the magnet holder is disposed to be enclosed by circumferential side surfaces of adjacent two claw-like magnetic poles, the flange thereof and the inside surface of the disk portion;
the magnet holder has a radial outer surface extending in the longitudinal direction, and a protrusion that protrudes to a radial outside from the radial outer surface;
the protrusion extends at approximately a center portion between circumferentially adjacent claw-like magnetic poles in the longitudinal direction between circumferentially adjacent two flanges of the claw-like magnetic poles each of the claw-like magnetic poles has a flange portion extending in a circumferential direction at a radial outside portion;
the radial outer surface of the magnetic holder is disposed to contact a radial inner surface of the flange portion of an adjacent claw-like magnetic pole;
the magnet holder is formed by bending a non-magnetic plate to have a space to which the permanent magnet is fitted; and
two ends of the non-magnetic plate are joined to each other to form the protrusion.

11. The rotating electric machine according to claim 10, wherein the magnet holder has a longitudinal dimension that is shorter than a slant length of the inside surface of the disk portion.

12. The rotating electric machine according to claim 10, wherein:
the magnet holder has a hole in its circumferential side surface; and
the permanent magnet, the magnet holder and the claw-like magnetic poles are fixed to each other by a thermosetting resin flowing in the hole.

13. The rotating electric machine according to claim 10, wherein:
the non-magnetic metal plate has two end portions that are joined to each other to form the protrusion; and
one of the end portions of the non-magnetic metal plate has a recess portion into which the other one of the end portions of the non-magnetic metal plate is inserted to be engaged with each other.

14. The rotating electric machine according to claim 1, wherein the protrusion is provided to increase strength of the magnet holder.

15. The rotating electric machine according to claim 10, wherein the protrusion is provided to increase strength of the magnet holder.

16. The rotating electric machine according to claim 1, wherein the radial outer surface continuously extends from a position where the protrusion is provided, at least to a position contacting the radial inner surface of the flange portion.

17. The rotating electric machine according to claim 10, wherein the radial outer surface continuously extends from a position where the protrusion is provided, to at least a position contacting the radial inner surface of the flange portion.

* * * * *